(12) United States Patent
Reusche et al.

(10) Patent No.: US 7,178,979 B2
(45) Date of Patent: Feb. 20, 2007

(54) WATER AGITATION SYSTEM FOR WATER RETENTION STRUCTURE

(75) Inventors: Thomas K. Reusche, Elburn, IL (US); Philip E. Chumbley, Aurora, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 246 days.

(21) Appl. No.: 10/827,640

(22) Filed: Apr. 19, 2004

(65) Prior Publication Data

US 2005/0229861 A1 Oct. 20, 2005

(51) Int. Cl.
*B01F 7/32* (2006.01)
*B01F 13/08* (2006.01)

(52) U.S. Cl. ........................ 366/273; 366/289
(58) Field of Classification Search .................. 366/65, 366/96–98, 262–265, 270, 273, 274, 297–299, 366/280, 286, 289
See application file for complete search history.

(56) References Cited

U.S. PATENT DOCUMENTS

| | | | |
|---|---|---|---|
| 2,272,582 A | 2/1942 | Poppe | |
| 2,877,051 A | 3/1959 | Cushman, et al. | |
| 3,595,537 A * | 7/1971 | Kaelin | 261/91 |
| 3,836,130 A | 9/1974 | Earhart et al. | |
| 4,086,306 A | 4/1978 | Yoshinaga | |
| 4,166,086 A | 8/1979 | Wright | |
| 4,216,091 A | 8/1980 | Mineau | |
| 4,422,771 A * | 12/1983 | Earhart et al. | 366/251 |
| 4,448,685 A | 5/1984 | Malina | |
| 4,465,377 A * | 8/1984 | de Bruyne | 366/273 |
| 4,534,656 A * | 8/1985 | de Bruyne | 366/247 |
| 4,681,711 A | 7/1987 | Eaton | |
| 4,723,848 A * | 2/1988 | Knight | 366/270 |
| 4,748,808 A | 6/1988 | Hill | |
| 4,759,635 A * | 7/1988 | MacMichael et al. | 366/274 |
| 4,760,028 A * | 7/1988 | deBruyne et al. | 435/302.1 |
| 5,336,399 A * | 8/1994 | Kajisono | 210/169 |
| 5,356,569 A | 10/1994 | Von Berg | |
| 5,470,152 A | 11/1995 | Rains | |
| 5,807,151 A | 9/1998 | Sumino | |
| 5,980,100 A | 11/1999 | Haegeman | |

(Continued)

FOREIGN PATENT DOCUMENTS

DE 337 980 6/1921

(Continued)

OTHER PUBLICATIONS

International Search Report for PCT/US2005/012632, dated Jul. 26, 2005.

*Primary Examiner*—Charles E. Cooley
(74) *Attorney, Agent, or Firm*—McAndrews, Held & Malloy, Ltd.

(57) ABSTRACT

A water agitation system configured to be positioned within a water retention structure configured to receive and retain water, includes a housing having a drive shaft extending downwardly therefrom; at least one upright member connected to a cross beam that is configured to rotate about a longitudinal axis of the drive shaft; and at least one buoyant stirrer that slidably engages an upright member. The buoyant stirrers are configured to move relative to the upright members in response to a level of water within the water retention structure.

31 Claims, 6 Drawing Sheets

U.S. PATENT DOCUMENTS

| | | | | |
|---|---|---|---|---|
| 6,029,955 A | * | 2/2000 | Drie | 261/64.5 |
| 6,036,357 A | * | 3/2000 | Van Drie | 366/332 |
| 6,322,056 B1 | * | 11/2001 | Drie | 261/81 |
| D457,595 S | | 5/2002 | Ellsworth et al. | |
| 6,733,171 B2 | * | 5/2004 | Schob | 366/273 |
| 6,926,437 B2 | * | 8/2005 | Drie | 366/335 |
| 2002/0089894 A1 | * | 7/2002 | Parlor | 366/245 |
| 2003/0053371 A1 | * | 3/2003 | Schoeb | 366/273 |
| 2003/0177914 A1 | * | 9/2003 | Schub | 99/348 |
| 2004/0052157 A1 | * | 3/2004 | Drie | 366/335 |
| 2005/0174882 A1 | * | 8/2005 | Krasne et al. | 366/249 |
| 2005/0201202 A1 | * | 9/2005 | Drie | 366/335 |

FOREIGN PATENT DOCUMENTS

| | | |
|---|---|---|
| EP | 0 127 971 | 12/1984 |
| FR | 1 102 143 | 10/1955 |
| FR | 2 449 473 | 9/1980 |
| GB | 2178971 A * | 2/1987 |

* cited by examiner

WATER AGITATION SYSTEM FOR WATER RETENTION STRUCTURE

RELATED APPLICATIONS

BACKGROUND OF THE INVENTION

The present invention generally relates to water retention structures, such as bird bath basins, livestock water tanks/troughs, swimming pools, small ponds, fish tanks, and the like, and more specifically to a water agitation system configured to be positioned within a water retention structure, to circulate or agitate water contained in the water retention structure.

Various water retention structures exist for a variety of purposes. For example, bird baths retain water for birds to bathe and frolic; swimming pools retain water for recreational purposes; backyard ponds retain water for aesthetic purposes (such as a habitat for small fish); livestock water tanks/troughs hold water for livestock to drink; water towers store water for various uses; and so on.

Bird baths are popular for attracting birds to residential homes, for example, and they may promote an interest in, and the well-being of, birds. An exemplary bird bath is described in U.S. Pat. No. 6,484,666, issued Nov. 26, 2002 to Thomas K Reusche, and assigned to Allied Precision Industries, Inc., which is hereby incorporated by reference in its entirety.

FIG. 1 illustrates an isometric view of a bird bath 10. The bird bath 10 includes a base 12 that supports a tube 14, which in turn supports a basin 16. The basin 16 is configured to receive and retain water.

It is known to provide pumps for imparting motion to the water in the bird bath basin. Movement of the water tends to attract birds to the bath. It also reduces the potential for the bird bath to serve as a haven for insects, e.g., mosquitoes, bacteria, germs, and the like. Water movement, or circulation, within the bird bath is particularly important given the recent rise of West Nile virus within the United States. However, pumps typically require access to an electrical outlet and are therefore not suitable when an electrical outlet is not readily available. Additionally, existing birdbaths cannot be easily retrofitted with such pumps.

Stagnant water in water retention structures typically increases the rate of breeding of insects, bacteria, germs, and the like. Further, stagnant, stale water is typically undesirable for a host of additional reasons. For example, the taste, odor and physical appearance of stagnant, stale water may be objectionable.

Thus, a need exists for an apparatus for imparting motion to water retained within water retaining structures, such as bird baths and livestock water tanks/troughs.

BRIEF SUMMARY OF THE INVENTION

Embodiments of the present invention provide a water agitation, or circulation, system positioned within a water retention structure that receives and retains water. The system includes a housing having a drive shaft extending downwardly from the housing. The drive shaft is operatively connected to a motor within the housing that is configured to rotate the drive shaft about a longitudinal axis of the drive shaft. A plurality of beams may be connected to a cross beam, or horizontal member, or directly to a distal end of the drive shaft, such that the beams are configured to rotate about the longitudinal axis of the drive shaft. A plurality of buoyant stirrers, each of which slidably engages one of the plurality of beams, are configured to move relative to the plurality of beams in response to a level of water within the water retention structure. The plurality of beams rotate about the longitudinal axis of the drive shaft along. The plurality of buoyant stirrers rotate along with the plurality of beams such that the rotation of the plurality of buoyant stirrers imparts motion to the water within the water retention structure.

The system may also include a tube extending downwardly from the housing, wherein the drive shaft is disposed within the tube and the horizontal member rotatably engages said tube. That is, the horizontal member loosely fits over the tube so that it may rotate relative to the tube. A magnet assembly may be connected to the drive shaft so that a rotation of the drive shaft causes the magnet assembly to rotate. Each of the plurality of buoyant stirrers includes a metal member that is magnetically coupled to the magnet assembly so that a rotation of the magnet assembly causes the buoyant stirrer(s) to rotate in response to the rotation of the magnet assembly.

The system may also include at least one support structure extending downwardly from the housing. The support structure abuts a surface of the water retention structure in order to support the housing above the surface of the water retention structure. Optionally, the system may include a flotation member configured to allow the water circulation system to float on water retained by the water retention structure.

Figure 1:
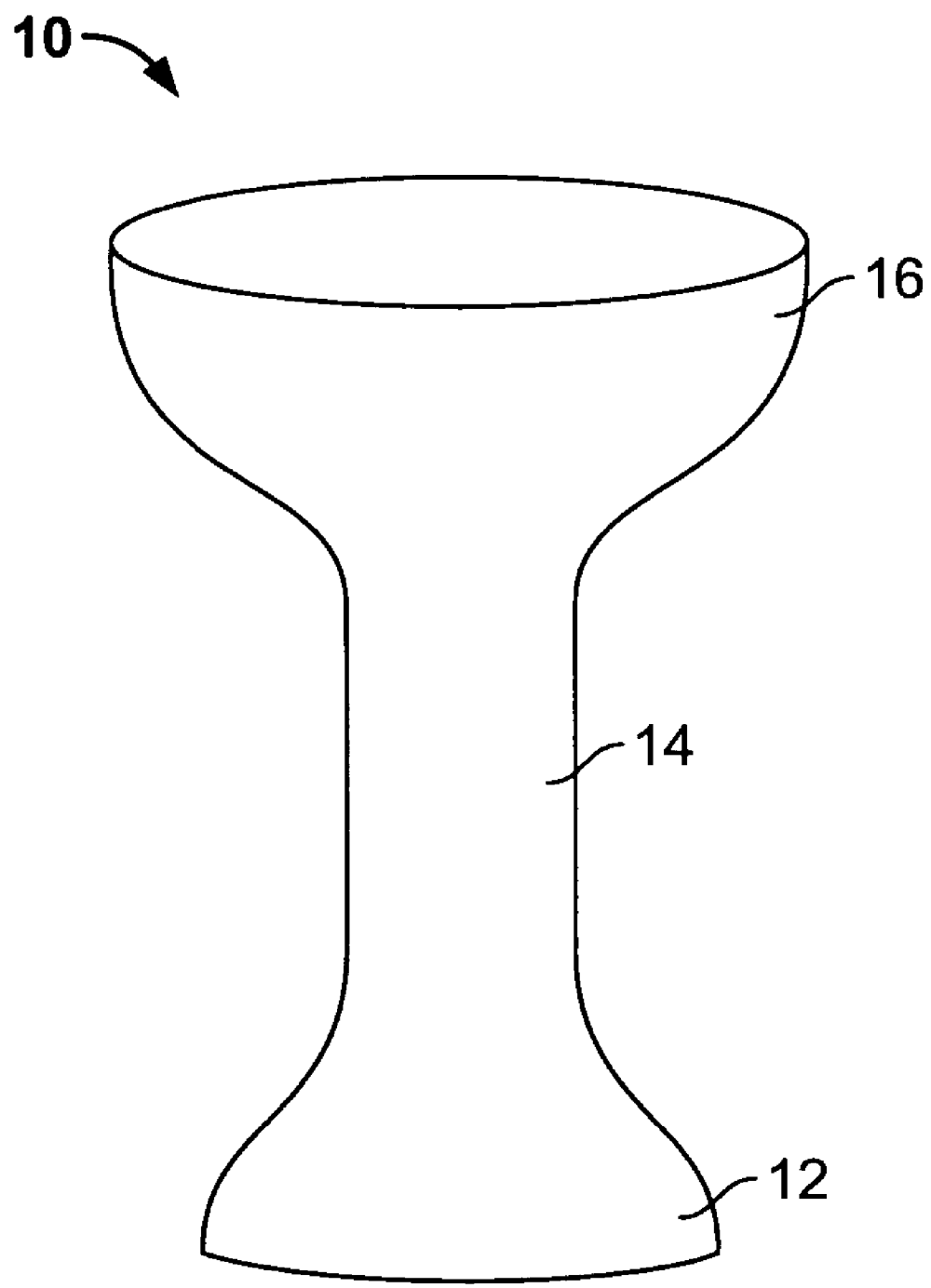
FIG. 1 illustrates an isometric view of a bird bath.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

Figure 2:
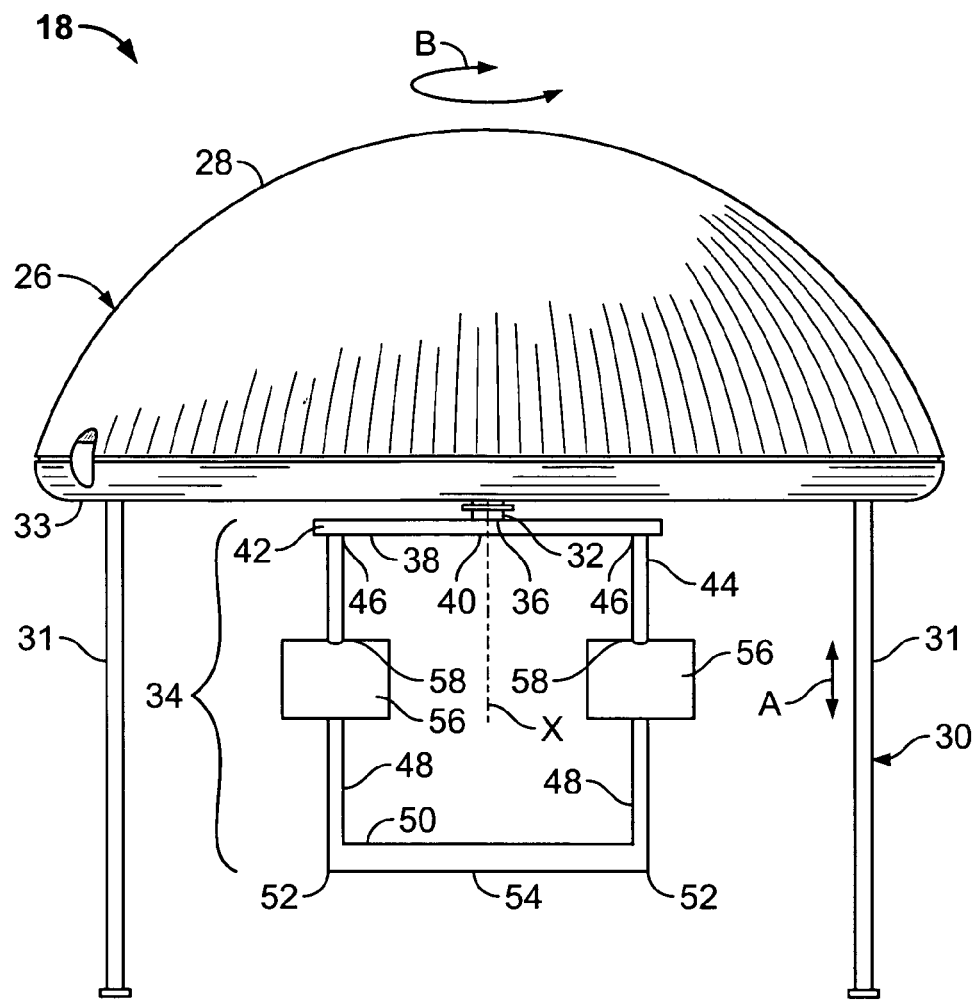
FIG. 2 illustrates an elevation view of a water agitation system according to an embodiment of the present invention.

FIG. 2 illustrates an elevation view of a water agitation system 18 according to an embodiment of the present invention. The water agitation system 18 may be sized and constructed for placement in the basin of a bird bath, such as the bird bath 10 shown in FIG. 1, for imparting motion to water contained in the basin. Optionally, the water agitation system 18 may be sized and constructed for use with livestock water tanks/troughs, small ponds, swimming pools, water towers, and various other water retaining structures.

Figure 3:
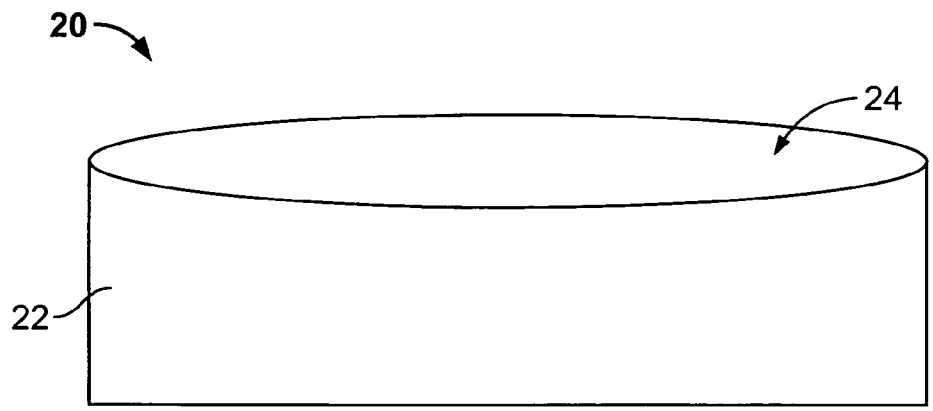
FIG. 3 illustrates a water retention structure.

FIG. 3 illustrates a water retention structure 20, in general. The water retention structure 20 includes a main body 22 defined by outer walls, which in turn define an interior cavity 24. The interior cavity 24 is configured to receive and retain water. The water retention structure 20 may also include a series of pumps, pipes, and the like (not shown) in order to allow the passage of water into and out of the interior cavity 24. The water retention system 20 may be formed in various shapes and sizes and may have an open top (such as a basin of a bird bath), or may be completely enclosed (such as a water tower). For example, the water retention structure 20 may be a basin of a bird bath such as the bird bath 10 shown in FIG. 1, a swimming pool, a livestock water trough, a backyard pond, etc.

Referring again to FIG. 2, the water agitation system 18 includes a main body 26 having an upper portion, or housing 28, and a lower portion, or agitation portion 30. Support members 31 extend downwardly from a base 33 of the housing 28. The support members 31 are configured to abut against a water retaining surface of a water retention structure in order to support the water agitation system 18 within the water retention structure.

A motor (not shown) and corresponding structures are disposed within the housing 28. The motor may be battery powered and/or electrically connected to a standard electrical outlet. The housing 28 is protected from moisture infiltration by at least one seal member (not shown). Overall, the housing 28 is constructed so that moisture does not penetrate into the interior of the housing 28.

The motor is operatively connected to a drive shaft 32, which is in turn operatively connected to an agitation assembly 34. The drive shaft 32 may be integrally formed with, fixed, joined, or otherwise connected to the agitation assembly 34.

The drive shaft 32 includes a distal end 36 that is connected to an upper cross beam 38 at a midpoint 40 of the cross beam 38. Alternatively, the distal end of the drive shaft 32 may be connected to the cross beam 38 at various other points. The cross beam 38 includes first and second ends 42, 44, which are integrally formed with, or otherwise connected to upper ends 46 of upright members 48. The upright members 48 also include lower ends 50 that may be integrally formed with, or otherwise connected to, ends 52 of a lower cross beam 54. The upper and lower cross beams, or horizontal members, 38 and 54 may be solid plastic members. Optionally, the upper and lower cross beams 38 and 54 may be wire frame members, or any other material that is sufficiently rigid enough to structurally support the upright members 48.

The agitation assembly includes buoyant stirrers 56, which may be Styrofoam, air bladders, or other such buoyant objects, that are configured to impart motion to surrounding water when the buoyant stirrers 56 are moved. The buoyant stirrers 56 are disk shaped, but may be any shape that is capable of imparting motion to surrounding water when the buoyant stirrers 56 are rotated or otherwise moved. The channel 58 of each buoyant stirrer 56 is configured to allow the buoyant stirrers 56 to slide over the upright member 48 in the direction of line A. The range of motion of each buoyant stirrer 56 is limited by the upper cross beam 38 and the lower cross beam 54. When positioned within a water retention structure, the buoyant stirrers 56 float on the surface of water such that at least a portion of each buoyant stirrer 56 is submerged within the water. Each buoyant stirrer 56 slidably engages each upright member 48. Each buoyant stirrer 56 slides over one of the upright members 48 through a channel 58 that extends through the body of the buoyant stirrer 56.

The buoyant stirrers 56 move along the upright members in relation to the depth of the water within the water retention structure. As water recedes, the buoyant stirrers 56 move downwardly on the upright members 48 in relation to the depth of the water. As the depth of the water increases, the buoyant stirrers 56 move up the upright members 48.

Alternatively, the agitation assembly 34 may not include the lower cross beam 54. Instead, the agitation assembly 34 may include stop blocks, or other such structures, located at lower ends 50 of the upright members 48 that act to limit downward movement of the buoyant stirrers 56. Also, alternatively, the upper and lower cross beams 38, 54 may be disks. Additional upright members may be positioned between the disks so that additional buoyant stirrers 56 may be used. Also, additional cross beams may be included. For example, two sets of upper and lower cross beams connected to corresponding upright members may be connected to the drive shaft so that a total of four buoyant members are included within the agitation assembly.

In operation, the water agitation system 18 is positioned within a water retention structure. The motor is activated to rotate the drive shaft 32, which in turn rotates the agitation assembly 34 in the direction of B about a longitudinal axis x of the drive shaft 32. The rotating motion of the agitation assembly 34 causes water that surrounds the agitation assembly 34 to move. For example, the rotating motion of the buoyant stirrers 56 stirs the surrounding water. As discussed above, the buoyant stirrers 56 float on the water and move along the upright members 48 in relation to the depth of the water within the water retention structure.

Figure 4:
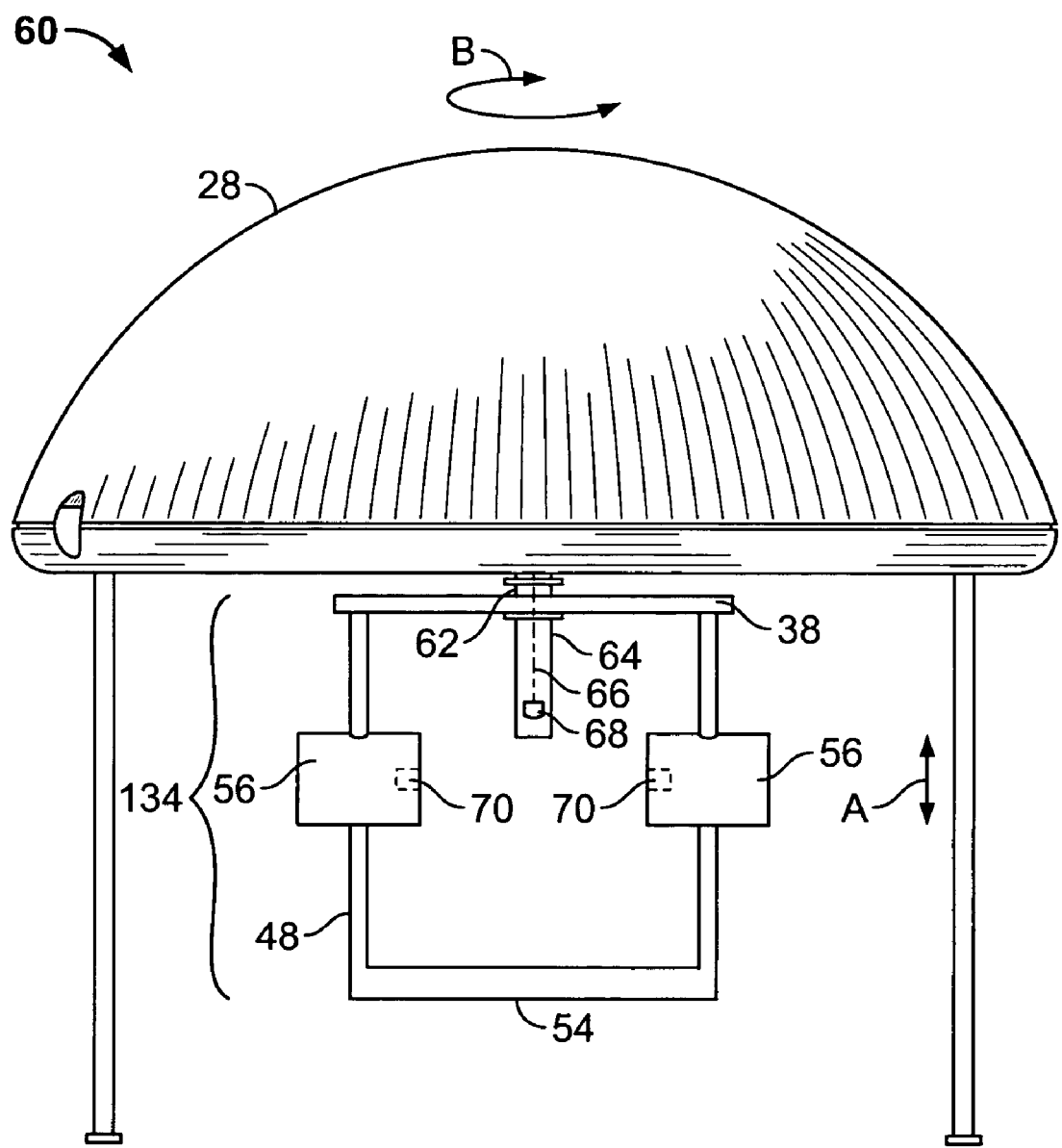
FIG. 4 illustrates an elevation view of a water agitation system according to an alternative embodiment of the present invention.

FIG. 4 illustrates an elevation view of a water agitation system 60 according to an alternative embodiment of the present invention. The water agitation system 60 includes an agitation assembly 134 that is similar in various respects to the agitation assembly 34 of FIG. 2. However, the upper cross beam 38 rotatably engages a tube 64 that extends downwardly from the housing 28 through a cavity 62. The upper cross beam 38 is fixed in the directions of line A with respect to the tube 64, but is configured to rotate about the tube 64 in the direction of B. Rotation of the upper cross beam 38 causes the upright members 48, the lower cross beam 54, and the buoyant stirrers to rotate in the same manner. As discussed below, however, the buoyant stirrers 56 rotate by way of a magnetically coupling with a rotating magnet assembly 68 positioned within the tube 64. Thus, the magnet assembly 68 causes the buoyant stirrers 56 to rotate, which in turns causes the upright members 48, lower cross beam 54 and upper cross beam 38 to rotate about the tube 64.

The tube 64 houses a drive shaft 66 that is operatively connected to a motor within the housing 28. A magnet assembly 68 is joined to a portion of the drive shaft 66. For example, the magnet assembly 68 may be disposed at a distal end of the drive shaft 66. As the drive shaft 66 is rotated in the direction of B, the magnet assembly 68 also rotates in the direction of B.

The buoyant stirrers 56 include metal or otherwise magnetic members 70 that are magnetically coupled to the magnet assembly 68. The members 70 are either magnetically attracted to, or repelled by, the magnet assembly 68.

Either way, a rotation of the magnet assembly 66 causes a responsive movement in the metal members 70. The movement of the metal members 70 causes a corresponding movement in the buoyant stirrers 56, which causes the agitation assembly 134 to rotate. The movement of the buoyant stirrers 56 positioned on the agitation assembly 134 imparts motion to water surrounding the buoyant stirrers 56.

Alternatively, the agitation assembly 134 may not include the lower cross beam 54. Instead, the agitation assembly 134 may include stop blocks, or other such structures, located at lower ends 50 of the upright members 48 that limit the downward motion of the buoyant stirrers 56. Also, alternatively, the upper and lower cross beams 38, 54 may be disks. Additional upright members may be positioned between the disks so that additional buoyant stirrers 56 may be used. Also, additional cross beams may be included. For example, two sets of cross beams and upright members may be connected to the drive shaft so that a total of four buoyant members are included within the agitation assembly.

Figure 5:
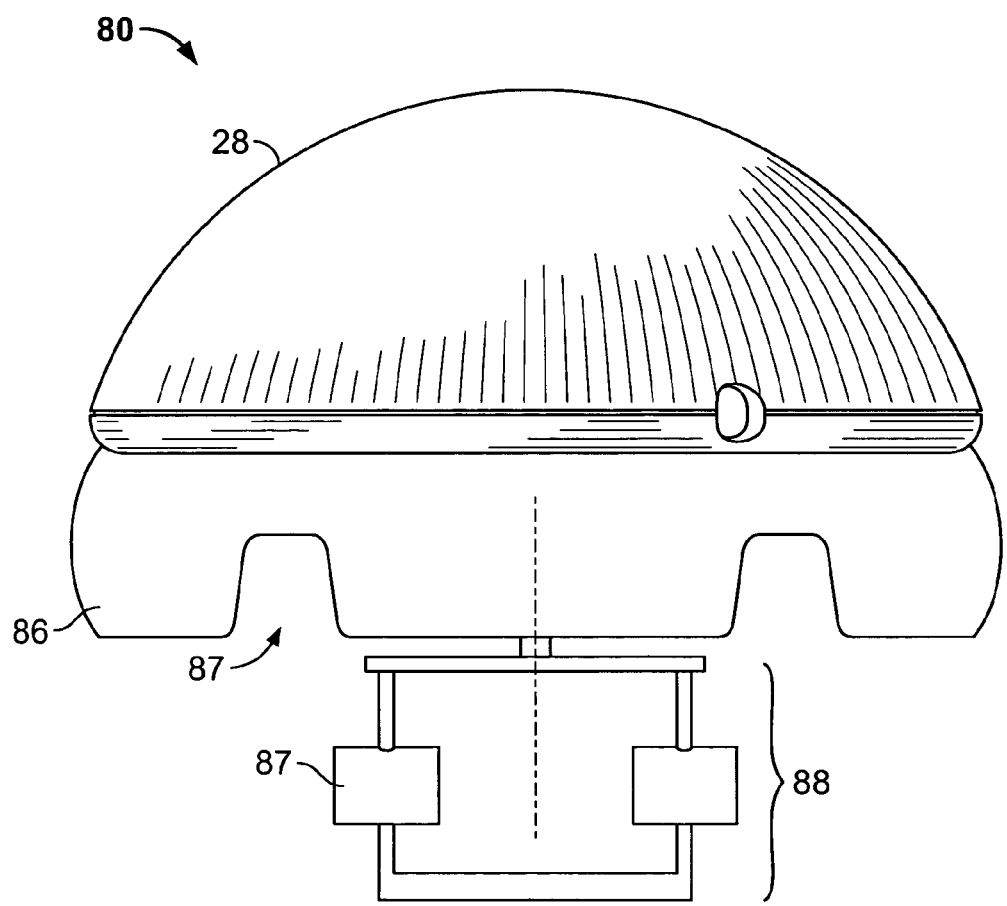
FIG. 5 illustrates an elevation view of a water agitation system according to another alternative embodiment of the present invention.

FIG. 5 illustrates an elevation view of a water agitation system 80 according to another alternative embodiment of the present invention. The water agitation system 80 is similar to the water agitation system 18 except that the system 80 includes a flotation member 86, but does not include support structures, such as the support structures 31 shown, for example, in FIG. 2. The flotation member 86 has channels 87 formed therethrough. The flotation member 86 may be a ring of buoyant material, such as Styrofoam, or an airtight tube filled with air. In particular, the flotation member may be a rubber tube or membrane that may be filled with air. The rubber membrane assists in protecting the motor and components within the housing 82 against water infiltration. Instead of a ring, the flotation member 86 may include a plurality of pontoons positioned underneath the housing 28. Preferably, the flotation member 86 provides enough buoyancy to ensure that the water agitation system 80 floats so that the agitation assembly 88 does not abut against a surface of a water retention structure. Optionally, the flotation member 86 may be positioned within the housing 28, instead of extending downwardly from the housing 28, as shown in FIG. 5. Also, the stirrers 87 do not need to be buoyant because the water agitation system 80 itself floats. Rather, the stirrers 87 may be plastic, metal, or various other materials that act to impart motion to surrounding water while remaining below the surface of the water retained within the water retention structure. The agitation assembly 88 may be configured similar to the agitation assembly 34 of FIG. 2, or the agitation assembly 134 of FIG. 4.

The systems 18, 60, and 80 may include a switch or timer, such as a photocell sensor, for selectively delivering power to the motor. The photocell sensor may be interconnected with the motor for activating the motor in the presence of light and deactivating the motor in the absence of light. The photocell sensor may be used to activate the motor during the day and to deactivate the motor at night to conserve battery power. Alternatively, a switch (not shown) may be provided to allow the user to manually activate/deactivate the motor. As another alternative, a timer (not shown) may be provided to allow the user to set the time(s) during which the motor is active and inactive. When a photocell is provided, it may also be desirable to provide a bypass mechanism for bypassing the photocell. Such a bypass mechanism may take the form of a switch (not shown). Alternatively, a wire within the housing can be moved between terminals to bypass the photocell.

Figure 6:
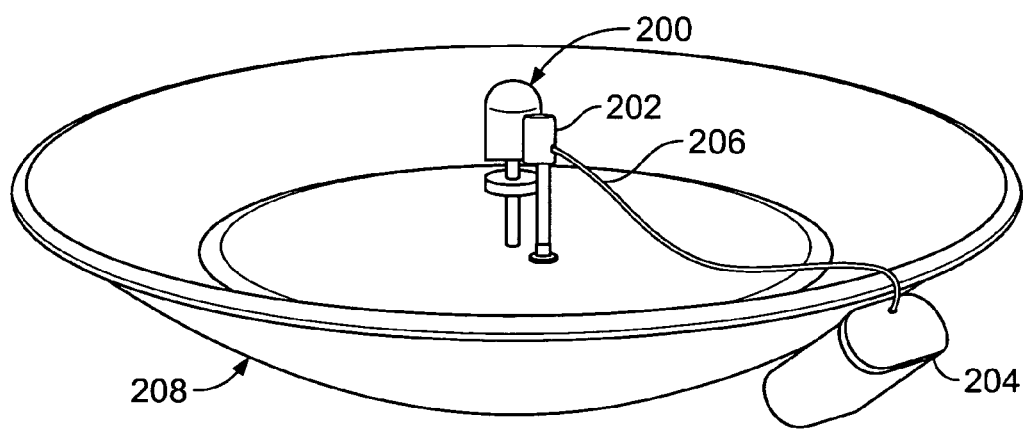
FIG. 6 illustrates an isometric view of a water agitation system according to an additional alternative embodiment of the present invention.

FIG. 6 illustrates an isometric view of a water agitation system 200 according to another alternative embodiment of the present invention. The water agitation system 200 includes a water agitation assembly 202 that is electrically connected to a remote power pack 204 through a water proof cable, or wire, 206. The water agitation assembly 202 is positioned within a water retention structure 208, such as a bird bath basin. The power pack 204 houses batteries, or may optionally provide an electrical connection between the water agitation assembly 202 and an electrical outlet. The water agitation assembly 202 houses a motor that operatively connects to a drive shaft having an agitation mechanism (as described above). Because the power pack 204 is located remotely from the water agitation assembly 202, less space within the water retention structure is occupied by the water agitation assembly 202.

Figure 7:
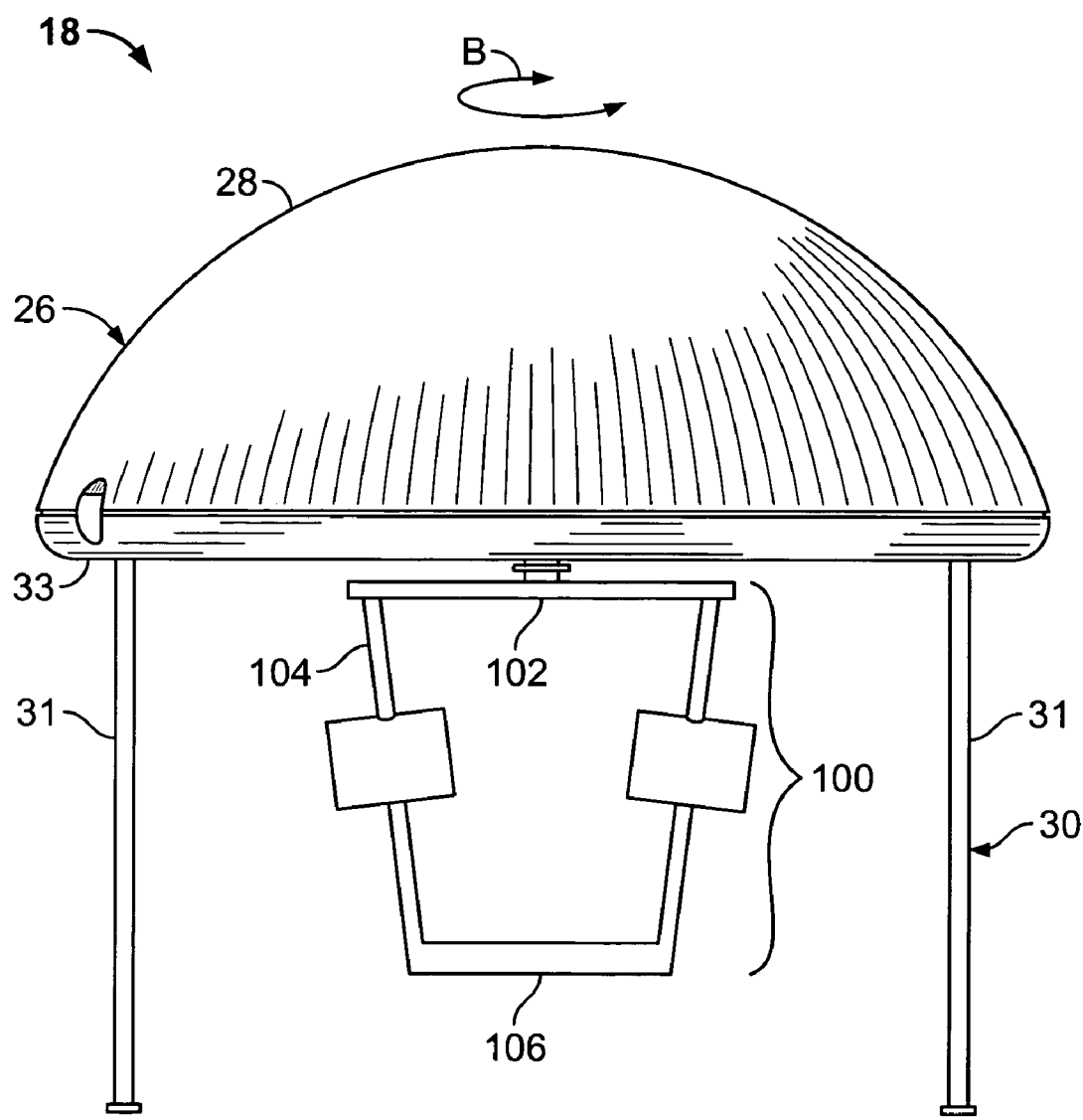
FIG. 7 illustrates an elevation view of a water agitation system according to an additional embodiment of the present invention.

FIG. 7 illustrates an elevation view of the water agitation system 18 according to an additional embodiment of the present invention. The system 18 includes an agitation assembly 100 having an upper cross beam 102 integrally connected to angled side beams 104, which are in turn integrally connected to a lower cross beam 106. Floating stirrers 106 are slidably positioned on the angled side beams 104. Optionally, the lower cross beam 106 may be removed such that the side beams 104 intergally connect at distal ends thereof. Similar to the other embodiments shown, more or less side beams 104 and stirrers 106 may be used. The agitation assembly 100 may also be used with the water agitation assembly 80 shown in FIG. 5.

Figure 8:
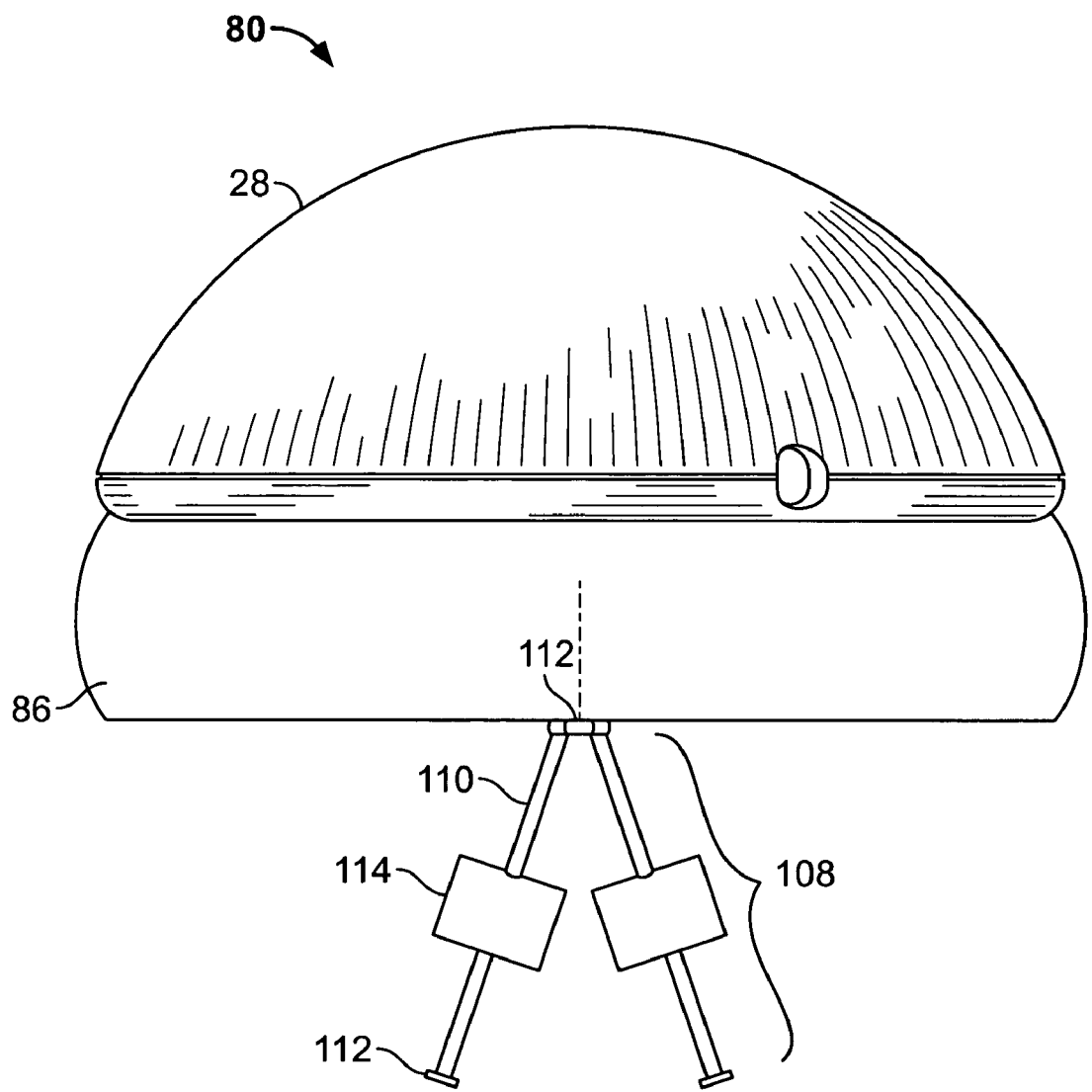
FIG. 8 illustrates an elevation view of a water agitation system according to an additional embodiment of the present invention.

FIG. 8 illustrates an elevation view of the water agitation system 80 according to an additional embodiment of the present invention. The system 80 includes an agitation assembly 108 having two angled beams 110 that are connected to a central rotatable axis 112. The distal ends of the beams 110 include stops 112 configured to prevent the stirrers 114 that are slidably positioned on the beams 110 from sliding off the beams 110. Similar to the embodiments discussed above, more or less beams 110 and stirrers 114 may be used. Additionally, the agitation assembly 108 may be used with the system 18 shown in FIG. 2.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A water agitation system configured to be positioned within a water retention structure configured to receive and retain water, said system comprising:

a housing having a drive shaft extending downwardly therefrom;

a plurality of beams operatively connected to said drive shaft, said plurality of beams configured to rotate about a longitudinal axis of said drive shaft; and at least one buoyant stirrer, that slidably engages at least one of said plurality of beams, wherein said at least one buoyant stirrer is configured to move relative to said at least one of said plurality of beams in response to a level of water within the water retention structure, wherein said plurality of beams includes first and second upright members, wherein said first upright member is connected to a first end of a horizontal member and said second upright member is connected to a second end of said horizontal member, and wherein said at least one buoyant stirrer includes a first buoyant stirrer that slidably engages said first upright member and a second buoyant stirrer that slidably engages said second upright member.

2. The water agitation system of claim 1, wherein said plurality of beams rotate about a longitudinal axis of said drive shaft, and wherein said at least one buoyant stirrer rotates along with said plurality of beams such that the rotation of said at least one buoyant stirrer imparts motion to water within the water retention structure.

3. The water agitation system of claim 1, further comprising a tube extending downwardly from said housing, wherein said drive shaft is disposed within said tube and a cross beam rotatably engages said tube, wherein a magnet assembly is connected to said drive shaft so that a rotation of said drive shaft causes said magnet assembly to rotate, and wherein said at least one buoyant stirrer includes a metal member that is magnetically coupled to said magnet assembly so that a rotation of said magnet assembly causes said at least one buoyant stirrer to rotate in response to the rotation of said magnet assembly.

4. The water agitation system of claim 1, further comprising at least one support structure extending downwardly from said housing, wherein said at least one support structure abuts a surface of the water retention structure.

5. The water agitation system of claim 1, further comprising a flotation member configured to allow the water circulation system to float on water retained within the water retention structure.

6. The water agitation system of claim 1, wherein the water retention structure is a basin of a bird bath.

7. The water agitation system of claim 1, wherein the water retention structure is a livestock water trough.

8. The water agitation system of claim 1, wherein the water retention structure is one of a swimming pool, water tower, and pond.

9. The water agitation system of claim 1, wherein said water circulation system is battery powered.

10. The water agitation system of claim 1, wherein said water circulation system is electrically connected to a standard electrical outlet.

11. The water agitation system of claim 1, further comprising at least one of a switch, timer and sensor for selectively activating and deactivating said water circulation system.

12. A water agitation system positioned within a water retention structure that receives and retains water, said system comprising:
a housing having a drive shaft extending downwardly from said housing, said drive shaft being operatively connected to a motor within said housing that is configured to rotate said drive shaft about a longitudinal axis of said drive shaft;
a plurality of beams connected to a cross bar that is configured to rotate about said longitudinal axis of said drive shaft; and
a plurality of buoyant stirrers, each of which slidably engages one of said plurality of beams, wherein said plurality of buoyant stirrers are configured to move relative to said plurality of beams in response to a level of water within the water retention structure, wherein said plurality of beams rotate about said longitudinal axis of said drive shaft along with said cross bar, and wherein said plurality of buoyant stirrers rotate along with said plurality of beams such that the rotation of said plurality of buoyant stirrers imparts motion to the water within the water retention structure.

13. The water agitation system of claim 12, wherein said plurality of beams includes first and second upright members, wherein said first upright member is connected to a first end of said cross bar and said second upright member is connected to a second end of said cross bar, and wherein at least one buoyant stirrer includes a first buoyant stirrer that slidably engages said first upright member and a second buoyant stirrer that slidably engages said second upright member.

14. The water agitation system of claim 12, further comprising a tube extending downwardly from said housing, wherein said drive shaft is disposed within said tube and said cross bar rotatably engages said tube, wherein a magnet assembly is connected to said drive shaft so that a rotation of said drive shaft causes said magnet assembly to rotate, and wherein each of said plurality of buoyant stirrers includes a metal member that is magnetically coupled to said magnet assembly so that a rotation of said magnet assembly causes said at least one buoyant stirrer to rotate in response to the rotation of said magnet assembly.

15. The water agitation system of claim 12, further comprising at least one support structure extending downwardly from said housing, wherein said at least one support structure abuts a surface of the water retention structure in order to support said housing above the surface of the water retention structure.

16. The water agitation system of claim 12, further comprising a flotation member configured to allow the water circulation system to float on water retained by the water retention structure.

17. The water agitation system of claim 12, wherein the water retention structure is a basin of a bird bath.

18. The water agitation system of claim 12, wherein the water retention structure is a livestock water trough.

19. The water agitation system of claim 12, wherein the water retention structure is one of a swimming pool, water tower, and pond.

20. The water agitation system of claim 12, wherein said water circulation system is battery powered.

21. The water agitation system of claim 12, wherein said water circulation system is electrically connected to a standard electrical outlet.

22. The water agitation system of claim 12, further comprising at least one of a switch, timer and sensor for selectively activating and deactivating said water circulation system.

23. A water agitation system positioned within a water retention structure that receives and retains water, said system comprising:
a housing having a drive shaft extending downwardly from said housing, said drive shaft being operatively connected to a motor within said housing that is configured to rotate said drive shaft about a longitudinal axis of said drive shaft;
a tube extending downwardly from said housing, wherein said drive shaft is disposed within said tube and said horizontal member rotatably engages said tube, wherein a magnet assembly is connected to said drive shaft so that a rotation of said drive shaft causes said magnet assembly to rotate;
first and second upright members connected to first and second ends of a horizontal member, respectively, said horizontal member being configured to rotate about said longitudinal axis of said drive shaft; and first and second buoyant stirrers that slidably engage said first and second upright members, respectively, wherein said first and second buoyant stirrers are configured to move relative to said first and second upright members, respectively, in response to a level of water retained within the water retention structure, wherein said first and second upright members are adapted to rotate about a longitudinal axis of said drive shaft along with said horizontal member, and wherein said first and second buoyant stirrers are adapted to rotate along with said first and second upright members, and wherein each of said first and second buoyant stirrers includes a metal member that is magnetically coupled to said magnet assembly so that a rotation of said magnet assembly causes said first and second buoyant members to rotate in response to the rotation of said magnet assembly in order to impart motion to the water retained within the water retention structure.

24. The water agitation system of claim 23, further comprising at least one support structure extending downwardly from said housing, wherein said at least one support structure abuts a surface of the water retention structure in order to support said housing above the surface of the water retention structure.

25. The water agitation system of claim 23, further comprising a flotation member configured to allow the water circulation system to float on water retained by the water retention structure.

26. The water agitation system of claim 23, wherein the water retention structure is a basin of a bird bath.

27. The water agitation system of claim 23, wherein the water retention structure is a livestock water trough.

28. The water agitation system of claim 23, wherein the water retention structure is one of a swimming pool, water tower, and pond.

29. The water agitation system of claim 23, wherein said water circulation system is battery powered.

30. The water agitation system of claim 23, wherein said water circulation system is electrically connected to a standard electrical outlet.

31. The water agitation system of claim 23, further comprising at least one of a switch, timer and sensor for selectively activating and deactivating said water circulation system.

* * * * *